United States Patent
Vezina

(10) Patent No.: US 11,191,411 B2
(45) Date of Patent: Dec. 7, 2021

(54) VERTICAL SURFACE CLEANING AUTONOMOUS DEVICE

(71) Applicant: France Vezina, Ottawa (CA)

(72) Inventor: France Vezina, Ottawa (CA)

(73) Assignee: France Vezina, Ottawa (CA)

( * ) Notice: Subject to any disclaimer, the term of this patent is extended or adjusted under 35 U.S.C. 154(b) by 0 days.

(21) Appl. No.: 17/235,004

(22) Filed: Apr. 20, 2021

(65) Prior Publication Data

US 2021/0338032 A1 Nov. 4, 2021

Related U.S. Application Data

(60) Provisional application No. 63/016,999, filed on Apr. 29, 2020.

(51) Int. Cl.
*A47L 1/02* (2006.01)
*A47L 11/38* (2006.01)
*F16B 47/00* (2006.01)
*A47L 11/40* (2006.01)

(52) U.S. Cl.
CPC ............... *A47L 11/38* (2013.01); *A47L 1/02* (2013.01); *A47L 11/4002* (2013.01); *A47L 11/4088* (2013.01); *F16B 47/00* (2013.01); *A47L 2201/04* (2013.01)

(58) Field of Classification Search
CPC ........ A47L 1/02; A47L 11/38; A47L 11/4088; A47L 2201/04
See application file for complete search history.

(56) References Cited

U.S. PATENT DOCUMENTS

| | | | | | |
|---|---|---|---|---|---|
| 3,344,454 | A | * | 10/1967 | Severine | A47L 1/02 15/50.3 |
| 5,890,250 | A | * | 4/1999 | Lange | A47L 1/02 15/50.3 |
| 6,971,141 | B1 | * | 12/2005 | Tak | B25J 5/005 15/340.1 |
| 2003/0048081 | A1 | * | 3/2003 | Seemann | B62D 55/00 318/68 |

* cited by examiner

*Primary Examiner* — Randall E Chin

(57) ABSTRACT

A vertical surface cleaning device comprising a main body, a cleaning arm, a cleaning head, and leg mechanisms with grippers. The cleaning head applies a cleaning fluid on a surface to carry out a cleaning operation. A waste collector is provided to collect a waste material arising from the cleaning operation. The grippers may remain in a grip or in a release state. The segments of the leg mechanisms are articulatable to configure a first group of the leg mechanisms to stably hold the main body at a first place with the grippers remaining in the grip state. A second group of the leg mechanisms move in a desired direction with their grippers in release state while the first group stably holds the main body. The first group of the leg mechanisms then moves in the same direction while the second group holds the main body at a second place.

8 Claims, 6 Drawing Sheets

VERTICAL SURFACE CLEANING AUTONOMOUS DEVICE

CROSS-REFERENCE TO RELATED APPLICATIONS

This application claims the benefit of U.S. Provisional Application No. 63/016,999, filed Apr. 29, 2020, the contents of which are incorporated herein by reference.

FIELD OF THE INVENTION

The present invention relates to cleaning devices. More particularly, the present invention relates to autonomous cleaning devices engaged in cleaning of vertical surfaces.

BACKGROUND OF THE INVENTION

Facades of skyscrapers and other tall structures require regular cleaning. But, cleaning of the vertical surfaces of tall structures and high-rise buildings has always been a difficult and challenging task as it requires safe and right access equipment for the purpose. Various systems and methods have been developed for cleaning the surfaces which are located at considerable height from ground. Such systems and methods include devices that help cleaning staff to reach tall structures and, also, devices which can fly to reach a desired height and carry out the cleaning operation without requiring physical presence of a human being at the cleaning height. There also exist devices which can carry out facade cleaning while remaining suspended at height with the help of ropes or cables anchored to various points of the building structure.

However, all of these systems and methods have their inherent problems. For example, systems enabling manual cleaning at height involve risk to the human beings engaged for the job and devices which fly or remain suspended with the help of cables for the job cannot carry out effective cleaning.

Thus, there exists a need for a system and method which can overcome the above-mentioned problems associated with cleaning of tall structures.

OBJECTS OF THE INVENTION

An object of the present invention is to provide an autonomous cleaning device for cleaning of vertical surfaces.

Yet another object of the present invention is to provide an autonomous cleaning device which can reach any height on an inclined surface.

Still another object of the present invention is to provide a fail-safe system for automated cleaning of non-horizontal surfaces of tall structures.

Another object of the present invention is to provide an autonomous cleaning device for cleaning of rough and uneven surfaces of tall structures.

Yet another object of the present invention is to provide an efficient and effective system and method for cleaning of tall structures.

These as well as other objects of the present invention are apparent upon inspection of this specification, including the drawings attached hereto.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

Present invention is directed to an autonomous device for cleaning of inclined or vertical surfaces of high rise buildings. The autonomous cleaning device comprises a main body, one or more leg mechanisms coupled to the main body and a cleaning arm. The leg mechanisms are configured to have multi-degree of freedom movement. Grippers disposed on the leg mechanisms enable the autonomous cleaning device to hold on to and climb a vertical surface. The cleaning arm is configured to move and position itself at a desired location to clean a surface and collect the waste arising out of the cleaning operation from the cleaning spot itself.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which.

DETAILED DESCRIPTION OF THE INVENTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Figure 1:
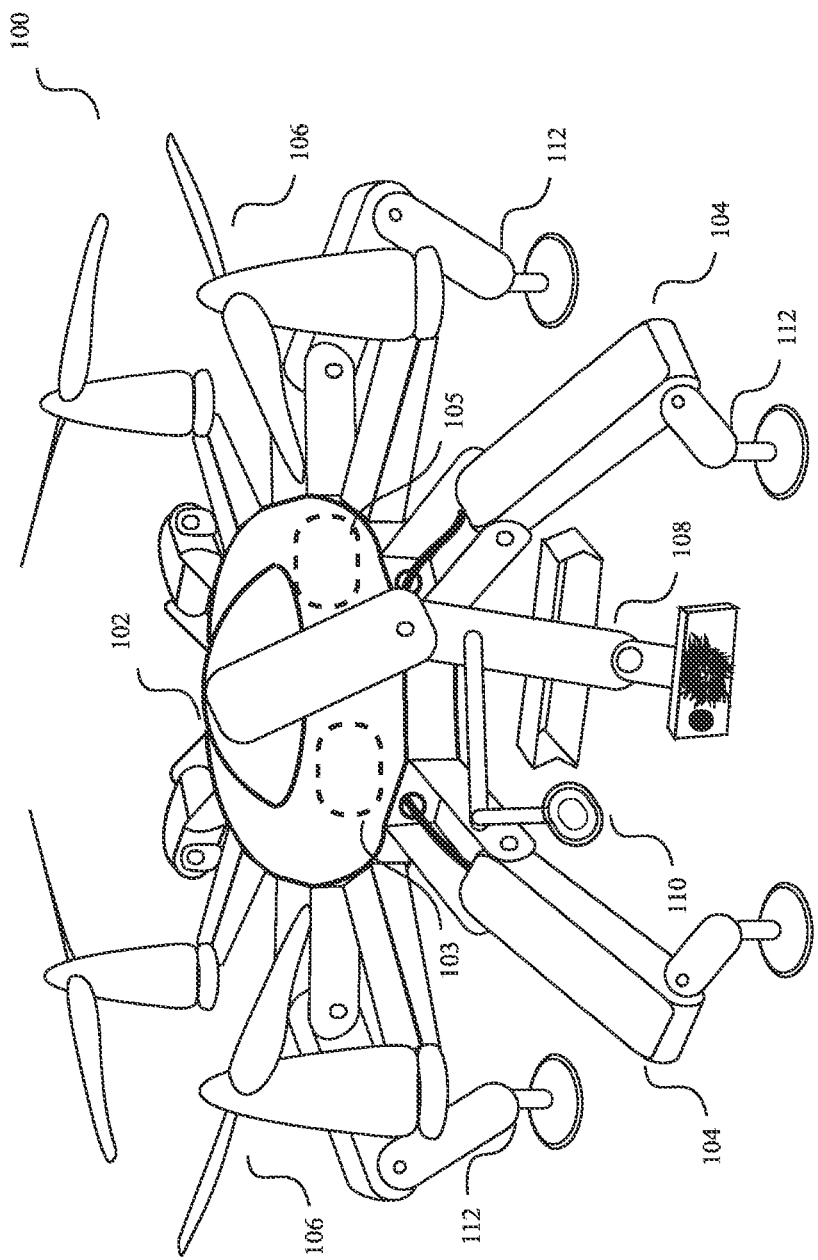
FIG. 1 is a top perspective view of the autonomous cleaning device in accordance with an embodiment of the present invention.
Figure 2:
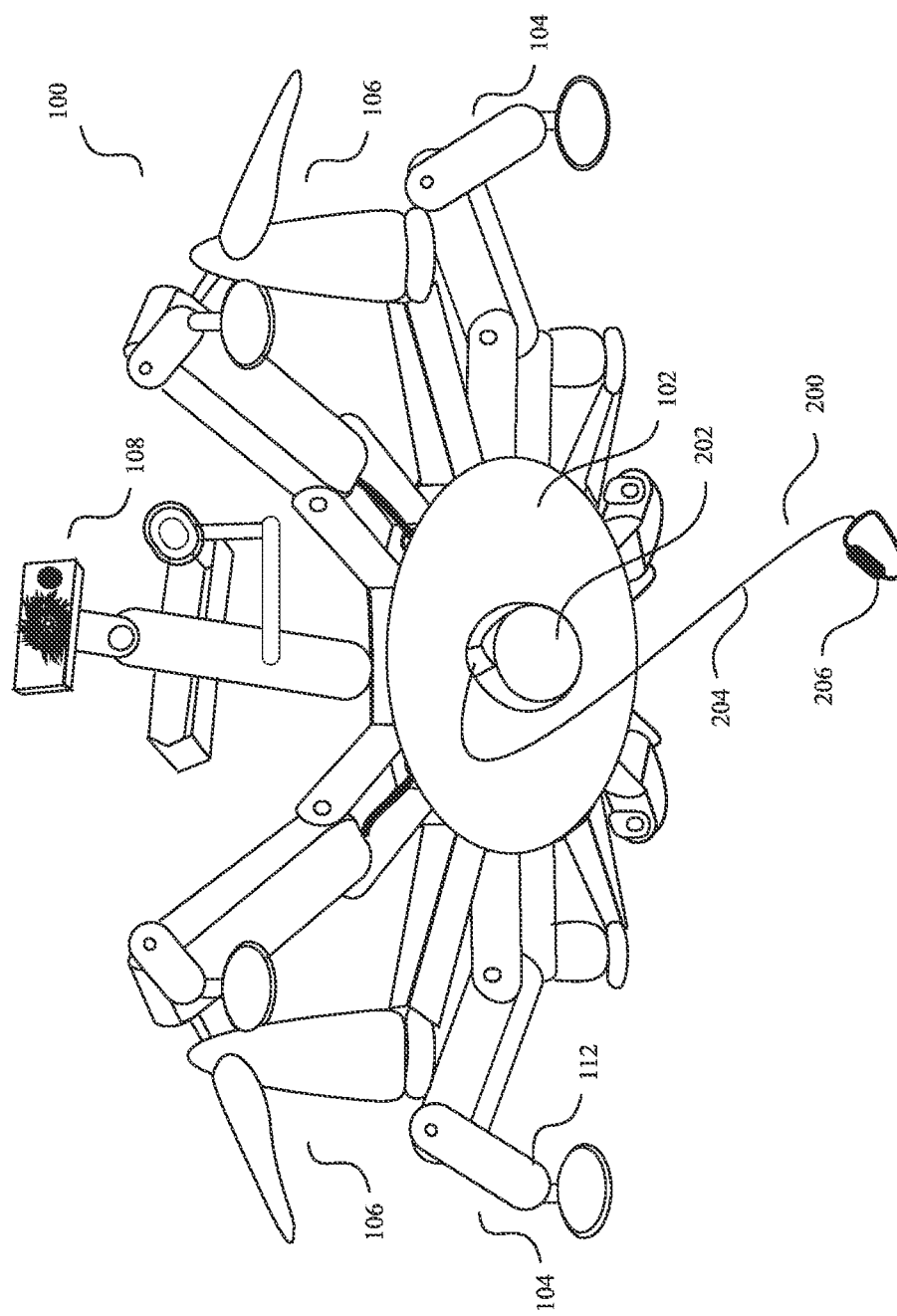
FIG. 2 is a bottom perspective view of the autonomous cleaning device in accordance with an embodiment of the present invention.

FIG. 1 depicts an embodiment of the autonomous cleaning device 100 of the present invention. The autonomous cleaning device 100 comprises a main body 102, a drive unit 103, a controller 105, a plurality of leg mechanisms 104 operably connected to the main body 102, a cleaning arm 108, a monitoring system 110 suitably positioned to monitor movement and cleaning activities and a number of sensors (not shown in diagram). Optionally, the autonomous cleaning device 100 may also comprise one or more propellers 106 and a fail-safe protection system 200 as shown in FIG. 2. The autonomous cleaning device 100 is configured to be able to walk or crawl/climb in any direction and at any inclination on even/smooth or uneven/rough surfaces. The propellers 106 enable the autonomous cleaning device 100 to fly and remain airborne at a desired location.

Figure 3A:
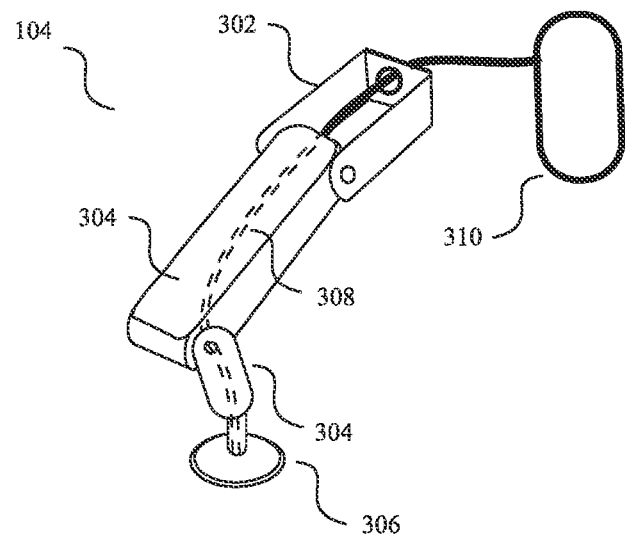
FIG. 3A is a close-up perspective view of a leg of the autonomous cleaning device in accordance with an embodiment of the present invention.

In the present embodiment, although six numbers of leg mechanisms 104 are illustrated, it is to be understood that the numbers of leg mechanisms can vary depending upon requirement. Also, the position of attachment of the leg mechanisms with respect to the main body can also be arranged as required. Similarly, although the leg mechanisms 104 are shown to be articulated type, in some other embodiments those can be of telescopic type also. In articulated type of leg mechanisms, reference to FIG. 3A each of the leg mechanisms 104 comprises a plurality of segments which include a support 302 and one or more links 304. The leg mechanisms 104 further comprises a gripper 306 attached to the distal end 112 of the leg mechanism 104, one or more joints which operably connect the links and one or more actuators for driving the links. The support 302 operably connects the leg mechanisms 104 to the main body 102 and can swivel with respect to the main body 102. The segments/links 304 of the leg mechanisms 104 are articulatable with respect to each other to perform actions at the degree of freedom of multiple axes by cooperative motion of the support 302, the links 304 and the respective actuators.

Although, the present embodiment is described with respect to a vacuum gripper (also referred to as suction cup, vacuum pad etc.), the gripping can also be achieved through electro-adhesion or dry-adhesion. The grippers are configured to be in either of two states—a grip state in which the grippers grip on the surface by way of vacuum created negative pressure, by electro-adhesion or by dry-adhesion, or a release state in which the grippers do not grip on the surface. The vacuum gripper 306 can be a flat suction cup or a bellow suction cup. A channel 308 establishes a fluid communication between the vacuum gripper 306 and the vacuum source 310. The vacuum source 310 can be installed on board the autonomous cleaning device 100 individually for each vacuum gripper 306 or centrally or even on a remote base station. The vacuum gripper 306 of the present example can be made of soft material such as silicate gel or similar material having a proper resiliency.

The vacuum source 310 removes the air from inside the vacuum gripper 306 creating a reduced pressure zone inside the vacuum gripper 306 with respect to the atmospheric pressure when the vacuum gripper 306 abuts a surface in a grip state. The abutment surface of the vacuum gripper 306 forms a sealing lip along the region of contact with the surface on which the vacuum gripper rests. A pressing force on the vacuum gripper 306 is generated to hold the vacuum gripper 306 firmly on the support surface due to the pressure difference created between the outside atmospheric pressure and the pressure inside the vacuum gripper 306 which is less than the atmospheric pressure. In case of the conventional vacuum grippers, a minor roughness of the surface on which the vacuum gripper rests can break the vacuum seal and result in failure of the grip. The vacuum gripper of the present invention is configured in such a way that the grip on the support surface is maintained even if the support surface is rough or uneven.

Figure 3B:
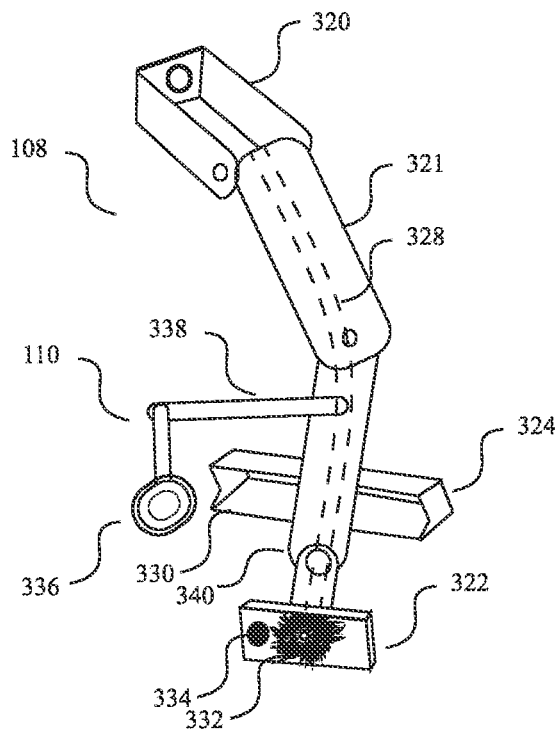
FIG. 3B is a close-up perspective view of the cleaning arm of the autonomous cleaning device in accordance with an embodiment of the present invention.

Reference to FIGS. 1, 2 and 3B, the cleaning arm 108 is configured to have multi-degree of freedom movements to carry out a dry or wet cleaning task on a surface. The cleaning arm 108 is operatively coupled to the main body 102 of the autonomous cleaning device 100 and comprises of a rotatable support 320, one or more links 321, a cleaning end 322 and waste collector 324. The mounting location of the cleaning arm 108 with respect to the main body 102 of the present invention should be such that it can carry out the cleaning function without interfering with the movement of the leg mechanisms or the propellers or any other component. The one or more links 321 enable the cleaning arm 108 to movably position a distal end 340 of the cleaning arm 108 at a desired position relative to the surface to be cleaned. The cleaning end 322 further comprises one or more cleaning brushes 332 and one or more cleaning fluid spray nozzles 334. A cleaning fluid channel 328 establishes a fluid communication for spray of cleaning fluid from a cleaning fluid tank (which may be located on board the autonomous cleaning device 100 or on ground) through the one or more nozzles 334. The waste collector 324 further comprises a leading edge 330 and one or more actuators and proximity/pressure sensors. The actuators can make the waste collector 324 move in such a way that the leading edge 330 made of soft material presses against the surface being cleaned just below the cleaning end 322 to collect the waste flowing down/falling off from the cleaning spot.

Although, the monitoring system 110 is shown mounted on the cleaning arm 108 in the drawings, it is to be understood that the monitoring system 110 can be mounted at any other suitable location of the autonomous cleaning device 100. The monitoring system 110 comprises an image/video acquisition device such as a camera 336 and one or more sensors. The one or more links 338 give the monitoring system 110 the flexibility to position the camera 336 and the sensors at a desired location to provide feedback to the controller 105 with respect to the cleaning operations and movements/navigation.

Figure 6:
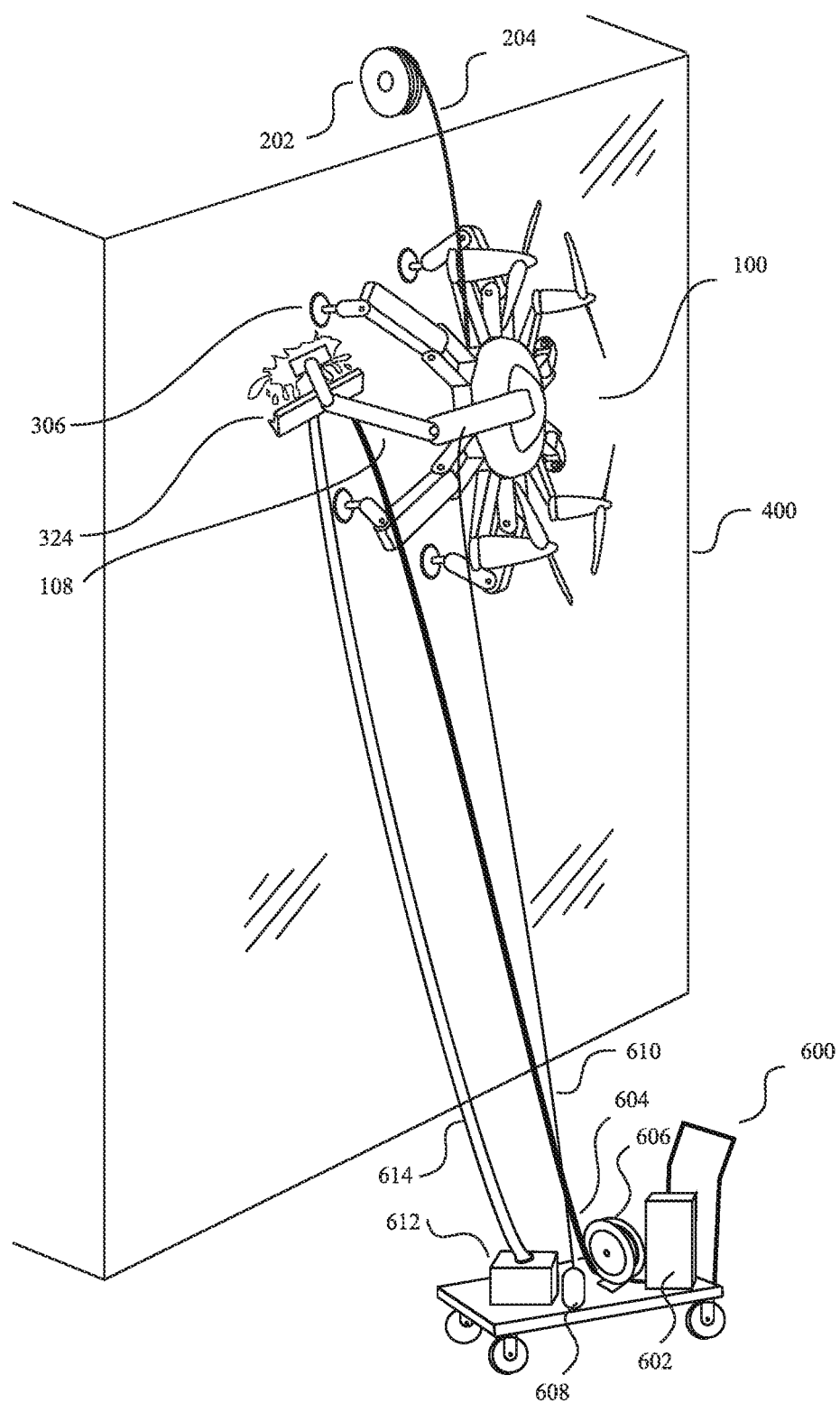
FIG. 6 is a perspective view of the autonomous cleaning device carrying out cleaning operation in accordance with an embodiment of the present invention.

In a preferred embodiment, a fail-safe protection system is installed on the autonomous cleaning device 100 to prevent any accidental fall of the autonomous cleaning device 100 in case of failure of the gripping or flying mechanisms. FIG. 2 illustrates a fail-safe system 200 mounted on the bottom side of the main body 102 of the autonomous cleaning device 100. The fail-safe system 200 comprises a retractable cable reel 202, a cable or rope 204 and a shackle 206 (e.g. a carabiner) disposed at the distal end of the cable 204. In some embodiments, as shown in FIG. 6, the retractable cable reel 202 can be affixed to a point located over the surface to be cleaned and the autonomous cleaning device 100 is provided with a hooking point for connecting the shackle. In either options, as long as the autonomous cleaning device 100 moves/crawls smoothly the retractable cable reel 202 keeps on releasing or retracting the cable 204 as per the pull exerted by the autonomous cleaning device 100 on the cable 204 so that no slack remains in the cable 202. On receiving any sudden jerk on the cable, for example, in the unlikely event of autonomous cleaning device 100 falling off for not being able to hold on to the support surface, the retractable cable reel 202 stops release of the cable 204 and, optionally retracts the cable 204 so that the autonomous cleaning device 100 reaches a safe position.

In one embodiment, the on board drive unit 103 is configured to power all the components of the autonomous cleaning device 100 alone while in some embodiments the individual components such as the leg mechanisms, propellers, vacuum source etc. can have their own drive units. In some other embodiments, the drive unit 103 can be powered from a remotely located base station.

For any movement of the autonomous cleaning device 100 in a particular direction, the controller 105 activates the leg mechanisms individually or in some specific groupings as per the need. For example, one of the leg mechanisms of the right side and two of the leg mechanisms of the left side of the autonomous cleaning device 100 can be grouped into a first group and others into a second group. In the crawling/climbing operation, while the first group of the three legs is off the ground and simultaneously operated to move forward or backward, the second group of the other three legs arranged at both sides of the main body 102 still stably supports the main body 102 on the crawling/climbing surface. Consequently, in this example, the first group and the second group of the leg mechanisms are alternatively operated to move forward, backward or sidewise so that the autonomous cleaning device 100 smoothly crawls or climbs even on an uneven and inclined surface.

Figure 4:
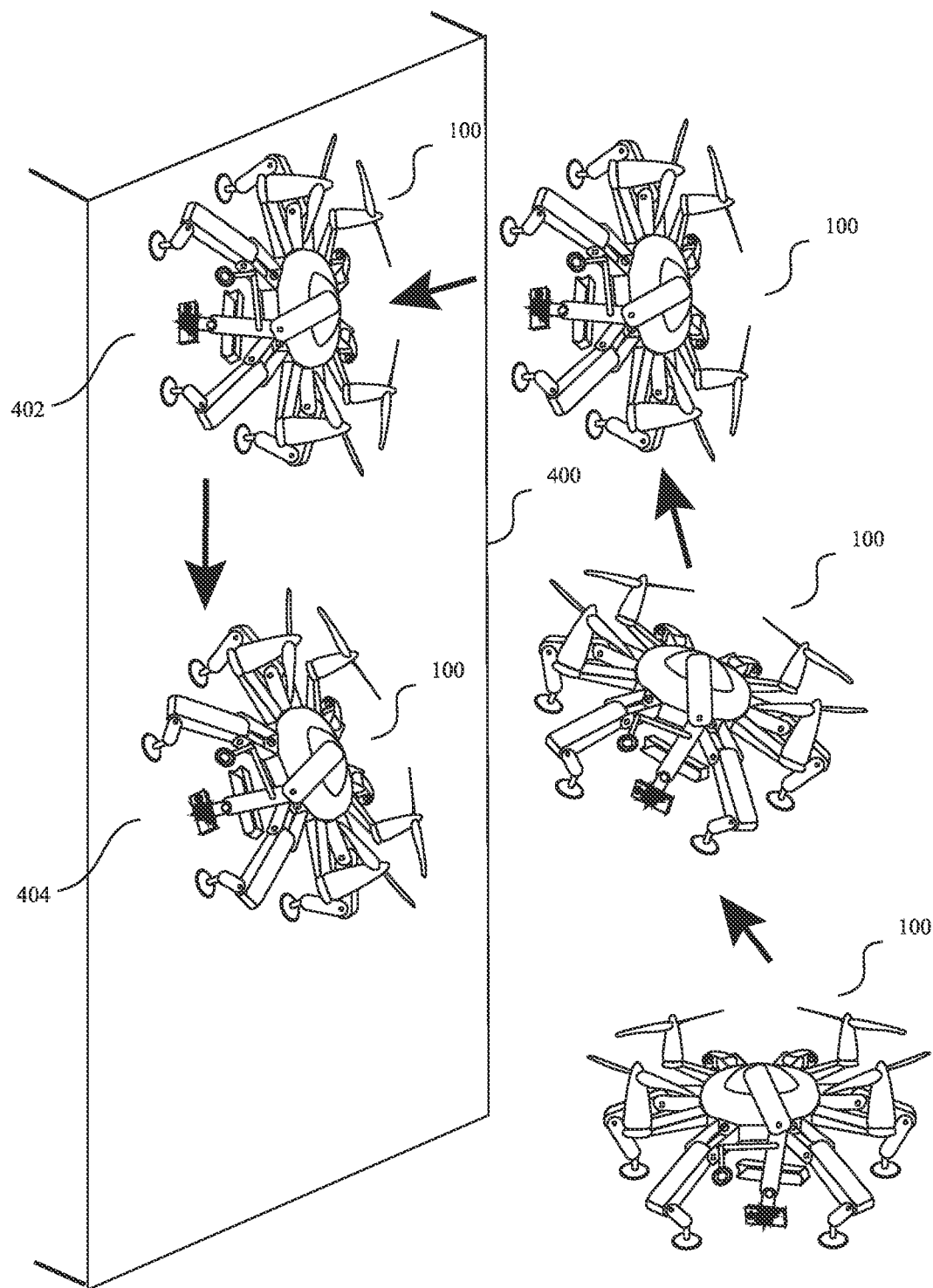
FIG. 4 is a representative view of the autonomous cleaning device in flying/crawling action in accordance with an embodiment of the present invention.

For use, the autonomous cleaning device 100 of the present invention is brought near the site and either or both of the movement modes—flying and crawling/climbing can be utilized to make it reach a desired destination. For example, in case of high rise buildings, as illustrated in FIG. 4, the autonomous cleaning device 100 can first fly to a desired location and then crawl on the surface 400 to be cleaned. The flying and crawling/climbing movements can be completely autonomous executed by the controller 105 based on some preset instructions and on real time feedback received from the various on board sensors. In some embodiments, it can also be completely manually controlled or can even be semi-automatic. In automatic or semi-automatic mode the controller 105 also controls the movement and functions of the peripheral components of the autonomous cleaning device 100 such as the cleaning arm 108 and the monitoring system 110.

FIG. 6 illustrates the autonomous cleaning device 100 carrying out a cleaning operation on a surface 400. An optional ground cart 600 is shown in FIG. 6 which can carry a cleaning fluid tank 602, a cleaning fluid supply hose 604, a cleaning fluid supply hose reel 606, a power source 608, power cable 610, a waste collector tank 612 and a waste hose 614. In addition, the ground cart can also house a vacuum source with arrangement to establish fluid communication with the autonomous cleaning device 100.

Reference FIGS. 1 to 6, before beginning the cleaning function, the autonomous cleaning device 100 positions itself on the support surface (the surface on which the autonomous cleaning device 100 rests) and the grippers firmly hold the cleaning device 100 against the support surface. FIG. 6 depicts the autonomous cleaning device 100 hooked to the reel 202 of the optional fail-safe mechanism through the cable 204 as a safety measure. The fail-safe mechanism blocks movement of the cable 204 against a shock load by engaging a braking system thereby preventing accidental fall of the autonomous cleaning device 100.

In some embodiments, one or more force sensors are disposed on the grippers 306 to detect the force applied to the cleaning surface 400 by the leg mechanisms 104 as they attempt to take a grip on the cleaning surface. At first, some of the grippers 306 remain at atmospheric pressure i.e. in a non-sucking condition. On finding the best position, the autonomous cleaning device 100 firmly holds itself to the cleaning surface by engaging all the grippers 306. The sealing lip of the grippers 306, being made of flexible material, conforms to the shape/texture of the cleaning surface and the vacuum created inside the grippers 306 by the vacuum source 310 make the grippers 306 hold on to the cleaning surface. While staying at the same location the main body 102 of the autonomous cleaning device 100 can change its inclination with respect to the cleaning surface with the help of the movement of the links of the leg mechanisms 104.

The cleaning action can be carried out by the autonomous cleaning device 100 while being stationary or on the move. The cleaning arm 108 is positioned at a desired orientation and location as per preset instructions and/or based on feedback. The cleaning fluid is injected through the nozzle 334 and sprayed on the cleaning surface and the brush 332 carries out the cleaning operation. The cleaning fluid sprayed on the surface and the other waste material are collected by the collector 324 with the help of the leading edge 330 which gently presses against the surface being cleaned below the location of the cleaning end 322 of the cleaning arm 108. The waste material/fluid is then directed to the ground through the waste hose 614.

Figure 5:
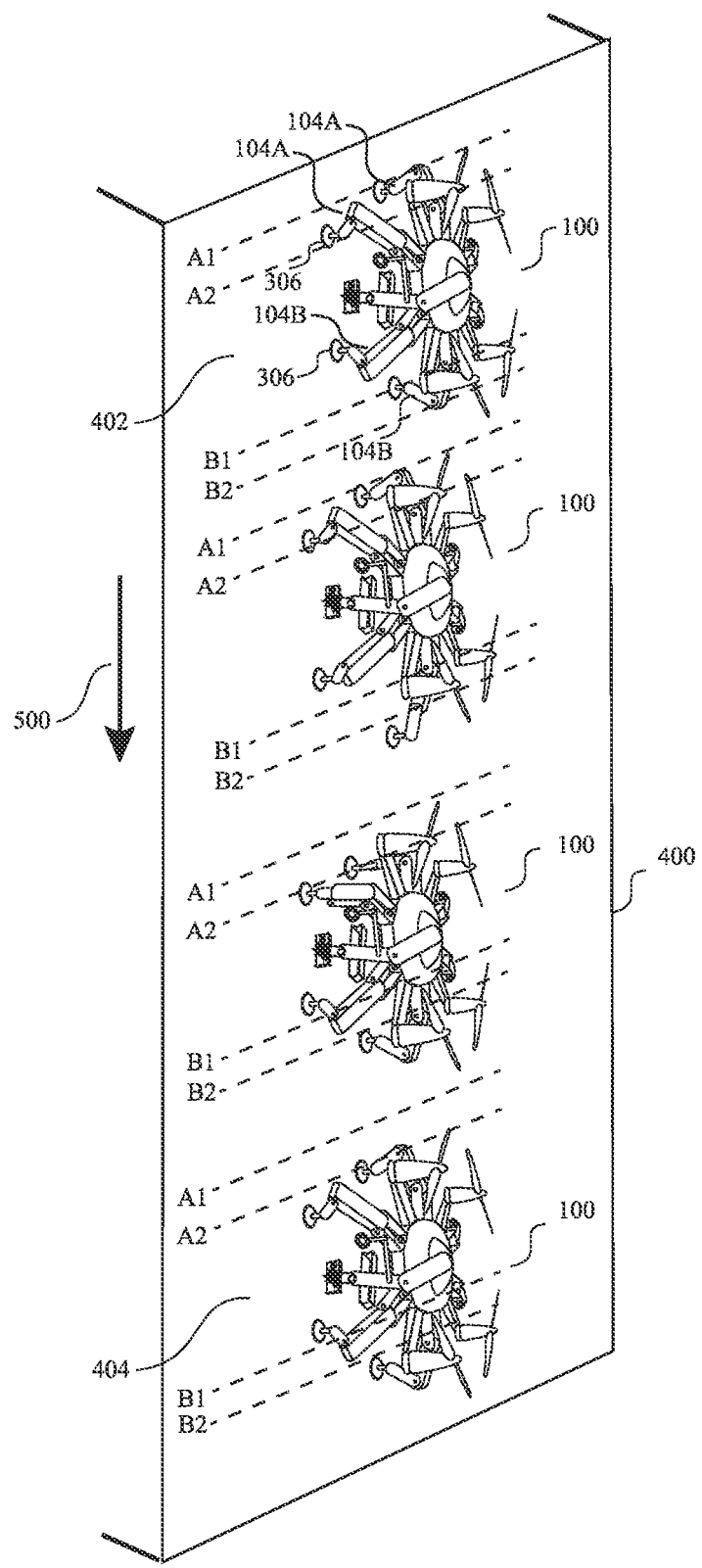
FIG. 5 is a representative view of the crawling steps of the autonomous cleaning device in accordance with an embodiment of the present invention.

Reference to FIG. 5, cooperative configurations of one or more leg mechanisms 104 achieved through articulation of the segments always stably hold the main body 102 at a desired orientation/position with respect to the surface 400. For example, a first group of the leg mechanisms 104A with the grippers 306 in grip state holds the main body 102 of the autonomous cleaning device 100 at first place 402 between the lines indicated by A1 and B1. To crawl or climb on the cleaning surface 400 from a stationary condition, as stated above, a second set of leg mechanism 104B comprising one or more leg mechanisms 104 are lifted off the cleaning surface after releasing the vacuum of the respective grippers 306 i.e. grippers 306 being in release state. Release of vacuum from the grippers 306 can be done by isolating the grippers from the vacuum source and/or by injecting air to the gripper. The second set/group of leg mechanisms 104B are then actuated to move forward or backward or sidewise (up to line B2 in the direction 500, for example), as required while the first group of leg mechanisms 104A maintains the orientation and position of the main body 102 with respect to the surface 400. As the grippers 306 touch the support surface, the fluid communication between the grippers 306 of the first set of leg mechanisms and the vacuum source is activated and the pressure inside the grippers 306 is reduced till the one or more sensors disposed on the grippers 306 detect the force/pressure with which the grippers 306 press against the support surface due to the pressure difference. The first set of the leg mechanism 104A comprising one or more of the leg mechanisms 104 is then articulated to extend and move (up to line A2, for example) in the desired direction thereby taking the main body 102 along (to second place 404, for example) to make the autonomous cleaning device 100 crawl or climb on the vertical surface.

What is claimed is:

1. An autonomous cleaning device for vertical surfaces, said autonomous cleaning device comprising:
   a main body;
   a cleaning arm operably affixed to said main body, said cleaning arm having one or more links configured to movably position a distal end of said cleaning arm relative to a surface to be cleaned;
   a cleaning end flexibly coupled to said distal end of said cleaning arm, said cleaning end comprising one or more cleaning brushes and one or more cleaning fluid spray nozzles configured to apply a cleaning fluid on said surface to carry out a cleaning operation;
   a waste collector flexibly coupled to said cleaning arm, said waste collector being configured to collect a waste material arising from said cleaning operation;
   a plurality of leg mechanisms operably connected to said main body, each of said plurality of leg mechanisms having a plurality of segments; and
   a gripper attached to a distal end of said each of said plurality of leg mechanisms, said gripper being configured to be either in a grip state in which said gripper grips on said surface or in a release state in which said gripper does not grip on said surface as per a selection;
   wherein said plurality of segments are articulatable with respect to each other to:
      configure at least a first group of said plurality of leg mechanisms to stably hold said main body at a desired orientation at a first place with respect to said surface when said gripper for each of said first group of said plurality of leg mechanisms is in said grip state;
      configure at least a second group of said plurality of leg mechanisms to move in a desired direction when said gripper for each of said second group of said plurality of leg mechanisms is in said release state while said first group of said plurality of leg mechanisms stably holds said main body at said desired orientation at said first place; and
      configure said first group of said plurality of leg mechanisms to move in said desired direction when said gripper for each of said second group of said plurality of leg mechanisms is in said grip state to enable said second group of said plurality of leg mechanisms stably hold said main body at said desired orientation at a second place away from said first place.

2. The autonomous cleaning device of claim 1, wherein said autonomous cleaning device further comprising one or more propellers configured to enable said autonomous cleaning device to fly and remain airborne at a desired location.

3. The autonomous cleaning device of claim 1, wherein said autonomous cleaning device further comprising a monitoring system mounted on said main body, said monitoring system comprising an image/video acquisition device and one or more sensors.

4. The autonomous cleaning device of claim 1, wherein said gripper is a vacuum type gripper or an electro-adhesion type gripper or a dry-adhesion type gripper.

5. The autonomous cleaning device of claim 4, wherein an abutment surface of said vacuum type gripper forms a sealing lip along a region of contact with said surface on which said vacuum type gripper rests in said grip state.

6. The autonomous cleaning device of claim 5, wherein a vacuum source removes air from a space within said sealing lip for creating a reduced pressure zone inside said vacuum type gripper with respect to an atmospheric pressure in said grip state.

7. The autonomous cleaning device of claim 1, wherein said autonomous cleaning device further comprising a fail-safe system, said fail-safe system having a retractable cable reel, a cable and a shackle disposed at a distal end of said cable.

8. The autonomous cleaning device of claim 7, wherein said retractable cable reel stops release of said cable on receiving any sudden jerk on said cable.

* * * * *